United States Patent
Wang et al.

(10) Patent No.: US 12,328,249 B2
(45) Date of Patent: Jun. 10, 2025

(54) DEVICE AND METHOD OF INTRA-CHIP ROUTING OF NEURAL TASKS FOR OPERATING SYSTEM OF BRAIN-INSPIRED COMPUTER

(71) Applicants: ZHEJIANG LAB, Hangzhou (CN); ZHEJIANG UNIVERSITY, Hangzhou (CN)

(72) Inventors: Fengjuan Wang, Hangzhou (CN); Pan Lv, Hangzhou (CN); Min Kang, Hangzhou (CN); Shuiguang Deng, Hangzhou (CN); Ying Li, Hangzhou (CN); Gang Pan, Hangzhou (CN)

(73) Assignees: ZHEJIANG LAB, Hangzhou (CN); ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/267,402

(22) PCT Filed: Feb. 14, 2023

(86) PCT No.: PCT/CN2023/075811
§ 371 (c)(1),
(2) Date: Jun. 14, 2023

(87) PCT Pub. No.: WO2023/173977
PCT Pub. Date: Sep. 21, 2023

(65) Prior Publication Data
US 2024/0372799 A1  Nov. 7, 2024

(30) Foreign Application Priority Data
Mar. 15, 2022  (CN) .......................... 202210249528.7

(51) Int. Cl.
*H04L 45/122* (2022.01)
*H04L 49/109* (2022.01)

(52) U.S. Cl.
CPC .......... *H04L 45/122* (2013.01); *H04L 49/109* (2013.01)

(58) Field of Classification Search
None
See application file for complete search history.

(56) References Cited

U.S. PATENT DOCUMENTS 8,977,578 B1   3/2015  Cruz-Albrecht et al.
11,191,013 B1* 11/2021  Kalkunte ............ H04W 64/003
(Continued)

FOREIGN PATENT DOCUMENTS

CN   111565152 A   8/2020
CN   112163673 A   1/2021
(Continued)

OTHER PUBLICATIONS

Young et al., "Scaled-up Neuromorphic Array Communications Controller (SNACC) for Large-scale Neural Networks", Jul. 1, 2020, IEEE, 2020 International Joint Conference on Neural Networks (IJCNN) (2020, pp. 1-8) (Year: 2020).*

(Continued)

*Primary Examiner* — Davoud A Zand

(57) ABSTRACT

A method and a device of intra-chip routing of neural tasks for an operating system of a brain-inspired computer are provided. The method includes determining an area defined by target cores, and determining target cores in a row furthest from an edge routing area; determining whether the target cores need to be configured with relay routing; searching nearest edge routing cores in the edge routing area for all the target cores in the area defined by the target cores; configuring the target cores in a far-to-near principle; and searching relay routing cores and the nearest edge routing cores by a shortest path manner and a maximum step length of a single routing manner.

18 Claims, 5 Drawing Sheets

(56) References Cited

U.S. PATENT DOCUMENTS

| | | | | |
|---|---|---|---|---|
| 11,467,946 B1* | 10/2022 | Jacob | ................... | G06F 11/3636 |
| 2022/0280072 A1* | 9/2022 | Timofejevs | ....... | G06F 18/24147 |
| 2023/0039386 A1* | 2/2023 | Kalkunte | ............ | H04W 52/143 |

FOREIGN PATENT DOCUMENTS

| | | | |
|---|---|---|---|
| CN | 112364988 A | | 2/2021 |
| CN | 112511445 A | | 3/2021 |
| CN | 112561042 A | | 3/2021 |
| CN | 114338506 A | | 4/2022 |

OTHER PUBLICATIONS

International Search Report of PCT/CN2023/075811.

* cited by examiner

DEVICE AND METHOD OF INTRA-CHIP ROUTING OF NEURAL TASKS FOR OPERATING SYSTEM OF BRAIN-INSPIRED COMPUTER

CROSS-REFERENCE TO RELATED APPLICATIONS

This application is an U.S. national phase application under 35 U.S.C. § 371 based upon international patent application No. PCT/CN2023/075811, filed on Feb. 14, 2023, which itself claims priority to Chinese patent application No. 2022102495287, filed on Mar. 15, 2022, titled "DEVICE AND METHOD OF INTRA-CHIP ROUTING OF NEURAL TASKS FOR OPERATING SYSTEM OF BRAIN-INSPIRED COMPUTER" The contents of the above identified applications are hereby incorporated herein in their entireties by reference.

TECHNICAL FIELD

The present disclosure relates to the field of an operating system of a brain-inspired computer, and in particular, to a device and method of intra-chip routing of neural tasks for an operating system of a brain-inspired computer.

BACKGROUND

Currently, conventional computers with a von Neumann architecture have difficulty meeting computing performance requirements of artificial intelligence in high-speed development, especially in the field of low-power and high-performance computing, such as edge computing. Therefore, a spiking neural network provides a feasible path for seeking lower power consumption and more efficient computing performance. However, it is difficult to simulate the spiking neural network on the computers with the von Neumann architecture, and a brain-inspired computing chip has emerged to solve this problem. The brain-inspired computing chip runs the spiking neural network by simulating a biological brain structure. Compared with a computing architecture in the related art, brain-inspired computing draws on basic rules of information processing in the biological brain, and essential changes are made on multiple levels such as hardware implementation and software algorithms, thus achieving significant improvements in power consumption, computing capabilities and the like. A brain-inspired computer is a new computer model constructed by horizontally expanding multiple brain-inspired computing chips. The brain-inspired computer has an ability to run ultra-large-scale spiking neural tasks. An operating system of the brain-inspired computer provides transparent management of computing resources, and provides an ability to input the neural tasks into the brain-inspired computing chips. Neural tasks refer to running entities of neural models in the brain-inspired computing chips.

A brain-inspired computing chip is composed of a two-dimensional grid structure with a size of m*n, and each grid represents a core. Each core can both store model data of neural tasks and also provide routing functions. Intra-chip routing refers to a communication path selected to route a packet from an edge routing core to a target core in a chip, and the intra-chip routing includes the edge routing core and a relay routing core. The operating system of the brain-inspired computer can only interact with the edge routing cores of the brain-inspired computing chip due to characteristics of the brain-inspired computing chip. The packet can be routed to the target core by the edge routing core, and a step length of a single route is limited. When the step length between the target core and the edge routing core exceeds a limit, the relay routing core needs to be found, that is, the packet is routed to the relay routing core by the edge routing core first, and then routed to the target core by the relay routing core.

The brain-inspired computer supports multiple neural tasks to run in parallel, different neural tasks are assigned to different cores, and a core configured with a neural task can no longer be configured with other neural tasks. More cores will be configured for the ultra-large-scale neural tasks. When surrounding cores of a neural task are configured in advance, farther cores face a situation that routes are unreachable, and the neural task need to be split, thereby increasing a step length of an overall routing of the neural task and increasing overall running time of the neural task. Therefore, the operating system of the brain-inspired computer needs to select reasonable routing in order to solve the problem of the step length in the intra-chip routing. The related art is mainly about computers with the von Neumann architecture, and research on the intra-chip routing in the brain-inspired computer is still blank.

SUMMARY

According to various embodiments of the present disclosure, the present disclosure provides a method of intra-chip routing of neural tasks for an operating system of a brain-inspired computer. Cores in a brain-inspired computing chip are constructed into a two-dimensional grid, each grid represents a core, each core is configured to store model data of neural tasks and to provide relay routing, and the method includes the following steps:

at step 1, determining an area denoted as R2 (x2_min, y2_min, x2_max, y2_max), which is defined by target cores, and determining target cores denoted as R3 (x2_min, y2_max, x2_max, y2_max), which is in a row furthest from an edge routing area;
  at step 2, determining whether the target cores in R2 need to be configured with relay routing;
  at step 3, searching nearest edge routing cores in the edge routing area denoted as R1 for all the target cores in the area R2 defined by the target cores via a shortest step length manner, and performing step 5 after the searching is completed;
  at step 4, in order to utilize a core unconfigured with a neural task as the relay routing, configuring the target cores in a far-to-near principle, determining a coordinate of a starting search core from an area denoted as R4 (x4_min, y4_min, x4_max, y4_max) defined by the target cores that need to search for relay routing, the coordinate of the starting search core being denoted as search_core (x_search, y_search) and satisfying the following formula: search_core (x_search, y_search) =search_core (x4_min, y4_max); in order to configure the least relay routing cores and enable the number of target cores routed by a first-level relay routing core to be maximum, searching a maximum number of the target cores that the relay routing cores in the brain-inspired computing chip support to be configured each time, which is denoted as MAX_RELAY_CORES; for the target cores that need multi-level relays, searching multi-level relay routing cores and the nearest edge routing cores by a shortest path manner and a maximum step length of a single routing manner, until all the target cores in the area R4 defined by the target cores that need to search for relay routing are configured; and at step 5, packaging routing data and configuring the routing data into the brain-inspired computing chip according to packet encapsulation rules of the brain-inspired computing chip.

In some embodiments, the method of intra-chip routing of neural tasks for the operating system of the brain-inspired computer includes the following scenarios.

Scenario (1), the area R2 defined by the target cores needs no relay routing. A step length from the cores R3 in the row furthest from the edge routing area to the edge routing area R1 is less than or equal to a maximum step length routed by the relay routing cores in the brain-inspired computing chip and denoted as MAX_STEP, all routes are reachable by the nearest edge routing cores. The area R2 defined by the target cores are determined to be a core area denoted as R5 that does not need to search for relay routing, and R2 and R5 satisfy the following formula: R5 (x5_min, y5_min, x5_max, y5_max)=R2. The step 3 is performed to search the nearest edge routing cores corresponding to all the target cores.

Scenario (2), the area R2 defined by the target cores needs relay routing. The area R4 (x4_min, y4_min, x4_max, y4_max) defined by the target cores that need to search for relay routing is determined, and the step 4 is performed to search corresponding relay routing cores.

Scenario (3), some of the target cores need to be configured with relay routing, and the rest of the target cores do not need to be configured with relay routing. The area R4 (x4_min, y4_min, x4_max, y4_max) defined by the target cores that need to search for relay routing is determined, and the core area R5 (x5_min, y5_min, x5_max, y5_max) that does not need to search for relay routing is determined. The step 4 is performed to search corresponding relay routing cores and nearest edge routing cores for the area R4 defined by the target cores that need to search for relay routing, until the area R4 defined by the target cores that need to search for relay routing is configured. The step 3 is performed to configure the core area R5 that does not need to search for relay routing.

In some embodiments, at the step 3, the nearest edge routing cores refer to edge routing cores with a shortest Manhattan distance from the target cores.

In some embodiments, the step 4 further includes:

at step 4.1, traversing from the coordinate search_core of the starting search core, traversing horizontally with the maximum step length MAX_STEP routed by the relay routing cores in the brain-inspired computing chip, and not exceeding the area R4 defined by the target cores that need to search for relay routing; traversing vertically with the maximum step length MAX_STEP routed by the relay routing cores in the brain-inspired computing chip, and not exceeding the area R4 defined by the target cores that need to search for relay routing, i.e., a core edge of a computing task; recording the number of searched target cores, and ending the search when the number of searched target cores reaches the maximum number (i.e., 64) of the target cores that relay routing cores in the brain-inspired computing chip support to be configured; recording the searched target cores into a one-dimensional array list denoted as config_cores and updating a two-dimensional array that records core occupancy, i.e., a field of the core occupancy denoted as config in Table 1 named "brain-inspired resource usage table A" being 1; recording free cores which are traversed into a free core list denoted as "free_cores" as a configuration range of a first-level the relay routing core; recording column coordinates of horizontal traversal which are denoted as x and row coordinates of vertical traversal which are denoted as y; for each row traversed, subtracting a row coordinate of the starting search core which is denoted as y_search by 1; and recording a maximum step length of the horizontal traversal which is denoted as X_STEPS;

when traversing vertically outside the area R4 defined by the target cores that need to search for relay routing, i.e., y_search is less than y4_min, ending the traversal; and updating the row coordinate and a column coordinate of the starting search core: y_search=y4_max, and x_search=x_search+X_STEPS;

when the number of traversed target cores is equal to the maximum number MAX_RELAY_CORES of the target cores that relay routing cores in the brain-inspired computing chip support to be configured, and the current row is not traversed to the end, not updating the row coordinate y_search of the starting search core, and adding remaining untraversed cores in the current row to the free core list "free_cores" as the relay routing cores to select;

when the free core list "free_cores" is empty, adding cores in a row to which a row coordinate y_search of updated starting search core belongs to the free core list "free_cores" as the relay routing cores to select;

at step 4.2, searching a corresponding core as a first-level relay routing core denoted as relay (x, y) based on a principle of minimum sum of Manhattan distances from the relay routing core to all target cores, and updating searched relay routing core relay (x, y) to a relay routing dictionary denoted as F in Table 3, and next-hop cores of the relay routing core relay (x, y) being all target cores of this search in "config_cores";

at step 4.3, calculating a shortest step length from the relay routing core relay (x, y) to the edge routing area R1, when the shortest step length is less than or equal to the maximum step length MAX_STEP routed by the relay routing cores in the brain-inspired computing chip, determining a nearest edge routing core of the relay routing core relay (x, y), which is denoted as edge (x, y_min); when the shortest step length is greater than the maximum step length MAX_STEP routed by the relay routing cores in the brain-inspired computing chip, continuing to search the multi-level relay routing cores and the nearest edge routing cores;

at step 4.4, determining an area of multi-level relay, which is denoted as R6 (x6_min, y6_min, x6_max, y6_max) or R6 (x_min, y_min, x_max, y_search), taking the relay routing core relay (x, y) as the first-level relay routing core, searching the multi-level relay routing cores and the nearest edge routing cores in the area of multi-level relay R6 by the shortest path manner and the maximum step length of the single routing manner, and updating searched relay routing cores relay (x, y) to the relay routing dictionary F in Table 3; and at step 4.5, when the search is ended, performing the step 5 and configuring the relay routing dictionary and the target cores; and when the configuring is ended, returning to the step 4.1 to continue to search and configure other target cores that need relay routing according to the coordinate of updated starting search core denoted as search_core (x_search, y_search), until all the target cores that need relay routing are configured.

In some embodiments, at the step 4.1, outside the area defined by the target core that need to search for relay routing, refers to that the row coordinate of the starting search core is less than a minimum row coordinate of the area defined by the target cores that need to search for relay routing; and updating the row coordinate and the column coordinate of the starting search core, refers to taking a maximum row coordinate of the area defined by the target cores that need to search for relay routing as a new row coordinate of the starting search core, and taking a sum of the column coordinate of the starting search core and the maximum step length of the horizontal traversal as a new column coordinate of the starting search core.

In some embodiments, the step 4.2 further includes cyclically traversing the free core list free_cores (x, y) to search the relay routing core relay (x,y) with minimum sum of Manhattan distances to all target cores in the one-dimensional array list config_cores, and the sum of Manhattan distances to all target cores is as follows:

$$\sum_{i=0}^{n}|x-\text{dest\_}x_i|+|y-\text{dest\_}y_i|$$

n represents the number of target cores to be configured in the one-dimensional array list, x and y represent coordinates of a free core in the free core list, dest_xi and dest_yi represent coordinates of a target core to be configured in the one-dimensional array list.

In some embodiments, at the step 4.4, searching a specifical path and the nearest edge routing cores by the shortest path manner includes:
   at step 4.4.1, initializing a queue, each element of which is configured to store a current core coordinate and a preceding core coordinate; recording marker bits of the two-dimensional array with the same size of the queue, which are denoted as is Visited and configured for recording the cores that are accessed during the search, and initializing the marker bits of the two-dimensional array is Visited to 1 for the cores configured in the two-dimensional array brain-inspired resource usage table A that records the core occupancy;
   at step 4.4.2. putting the relay routing core relay (x, y) into the queue first, putting a second core (x, y_search) with the column coordinate x of the relay routing core and the row coordinate y_search of the updated starting search core into the queue secondly, and a preceding core coordinate of the second core (x, y_search) being the relay routing core relay (x, y);
   at step 4.4.3, determining whether the queue is empty, if no, performing step 4.4.4, otherwise continuing the determining;
   at step 4.4.4, when the queue is not empty, putting a core denoted as A at a head node of the queue out of the queue, cyclically searching cores denoted as B along adjacent four directions of the core A, checking whether the cores B are within a search range and whether the cores B are non-accessed, if yes, performing step 4.4.5, otherwise returning to the step 4.4.3;
   at step 4.4.5, configuring a preceding core of the cores B as the core A, putting the cores B into the queue, marking marker bits is Visited of the cores B to 1, checking whether the cores B are edge routing cores, if yes, ending the search, and returning to the queue, otherwise returning to the step 4.4.3; and
   at step 4.4.6, taking the last element of the non-empty queue returned at the end of the search as the nearest edge routing core of the shortest path which is denoted as edge_core, and searching preceding cores recorded in the elements from the last element of the non-empty queue and recording the preceding cores in a path list denoted as "path_list", until searching to a first relay routing core relay (x, y), and the path list "path_list" recording all cores on the shortest path.

In some embodiments, at the step 4.4, the maximum step length of the single routing manner includes:
   searching multi-level relay routing cores from the path list "path_list" based on a principle of maximizing relay step length and route reachability; configuring the least relay routing cores upon a condition that the routes are reachable, so as to reduce overhead caused by the configuration of the relay routing cores; taking the relay routing core relay (x, y) as the first-level relay routing core, and searching a second-level relay routing core from the path list "path_list", and a step length between the first-level relay routing core and the second-level relay routing core being the longest and not exceeding the maximum step length MAX_STEP routed by the relay routing cores in the brain-inspired computing chip; and searching a third-level relay routing core based on the second-level relay routing core as a starting point, until a step length between the relay routing core and the edge routing core is no more than the maximum step length MAX_STEP routed by the relay routing cores in the brain-inspired computing chip, and recording searched relay routing cores to the relay routing dictionary F.

In some embodiments, the step 3 further includes recording the traversed target cores and searched edge routing cores to an intra-chip routing dictionary denoted as E, the step 5 further includes packaging the relay routing dictionary F and the intra-chip routing dictionary E into a data packet recognizable by the brain-inspired computing chip based on the packet encapsulation rules of the brain-inspired computing chip, and configuring the data packet into the brain-inspired computing chip.

The present disclosure provides a device of intra-chip routing of neural tasks for an operating system of a brain-inspired computer, including one or more processors and a memory that stores executable codes, the executable codes are executed by the processor to implement the steps of the above method of intra-chip routing of neural tasks for the operating system of the brain-inspired computer.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

To describe and illustrate embodiments and/or examples of the present disclosure made public here better, reference may be made to one or more of the figures. The additional details or embodiments used to describe the figures should not be construed as limiting the scope of any of the present disclosure, the embodiments and/or examples currently described, and the best model of the present disclosure as currently understood.

In the figures, 100 represents a device of intra-chip routing of neural tasks for an operating system of a brain-inspired computer, 10 represents an internal bus, 11 represents a processor, 12 represents a memory, 13 represents a network interface, and 14 represents an internal memory.

DETAILED DESCRIPTION

The specific embodiments of the present disclosure are described in detail below with reference to the accompanying drawings. It should be understood that specific embodiments described herein are only used to explain the present disclosure and not intended to limit the present disclosure.

An operating system of a brain-inspired computer may maintain a global variable denoted as MAX_STEP, which is a maximum step length routed by the relay routing cores in the brain-inspired computing chip, and the present disclosure is described with the maximum step length of 15.

The operating system of the brain-inspired computer may maintain a global variable denoted as MAX_RELAY_CORES, which is a maximum number of target cores that relay routing cores in the brain-inspired computing chip support to be configured, and the present disclosure is described with the maximum number of the target cores of 64.

The operating system of the brain-inspired computer maintains a global variable denoted as MAX_RELAY_IDS, which is a maximum level of relay routing that relay routing cores in the brain-inspired computing chip support, and the present disclosure is described with the maximum level of relay routing of 7.

Figure 1:
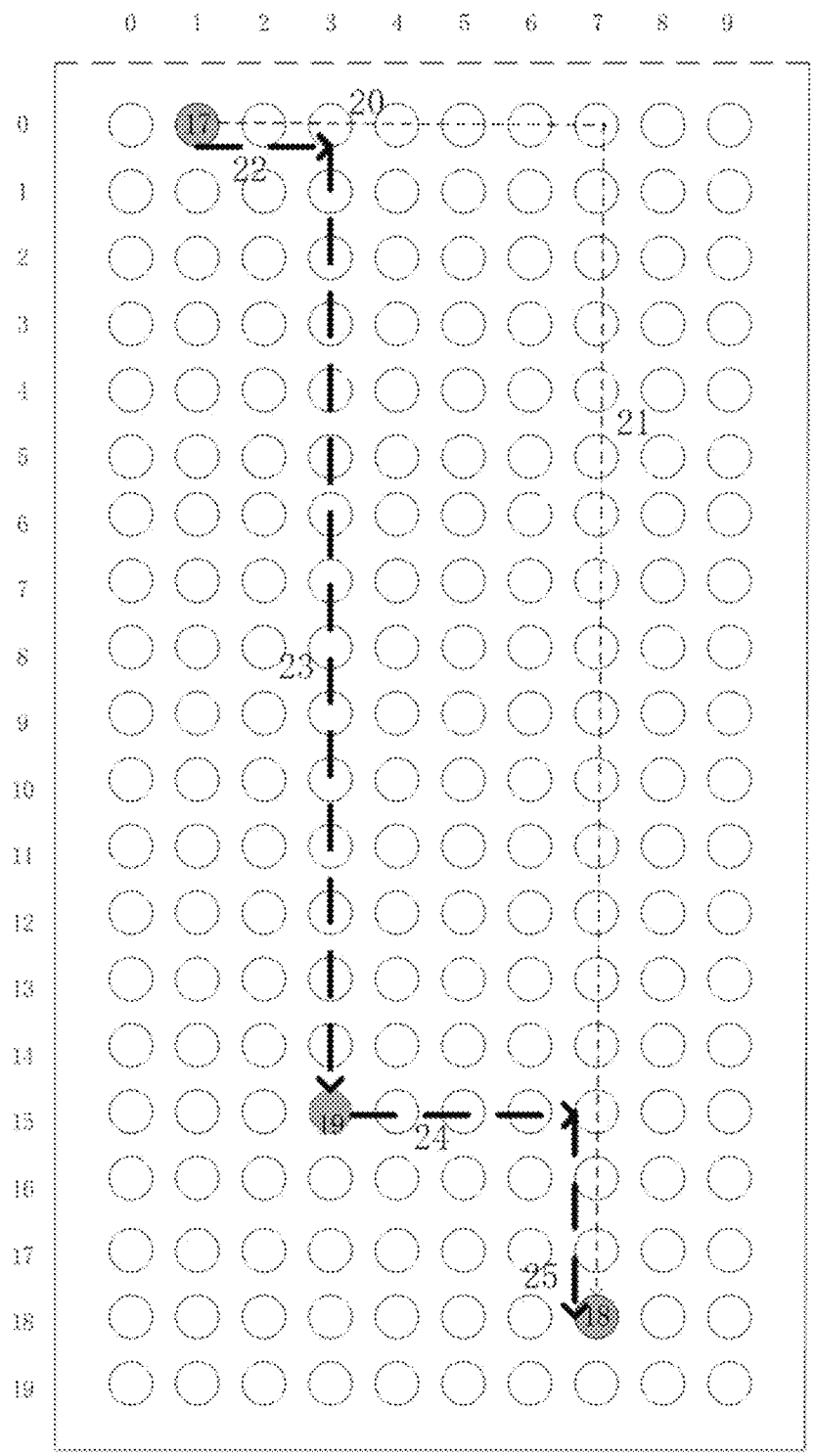
FIG. 1 is a schematic view of packets routed to target cores by edge routing cores in one or more embodiments of the present disclosure.

When configuration data of a computing task is written from a user address space to a target core of the brain-inspired computing chip, the operating system of the brain-inspired computer can only input packets to an edge routing core of the brain-inspired computing chip, and the packets can be routed to the target core of the brain-inspired computing chip by the edge routing core. When a step length from the edge routing core to the target core is greater than MAX_STEP, a relay routing core between the edge routing cores and the target core needs to be found, and the packets can be routed to the target core by the relay routing core. When the packets cannot be routed to the target core by one relay routing core, multi-level relay is needed. Referring to FIG. 1, when the packets need to be routed to the target core (7, 18) (18) by the edge routing core (1, 0) (17), six steps (20) can be carried out horizontally from the edge routing core (1, 0) (17), then eighteen steps (21) can be carried out vertically to the target core (7, 18) (18). Since the eighteen steps (21) carried out vertically is greater than the maximum step length MAX_STEP supported by the brain-inspired computing chip, the packets cannot be routed to the target core (7, 18) (18). Therefore, a proper relay routing core (3, 15) (19) needs to be found. Two steps (22) can be carried out horizontally from the edge routing core (1,0) (17), and fifteen steps (23) can be carried out vertically to reach the relay routing core (3, 15) (19). Next, four steps (24) can be carried out horizontally from the relay routing core (3, 15) (19), and three steps (25) can be carried out vertically to reach the target core (7, 18) (18).

Figure 2:
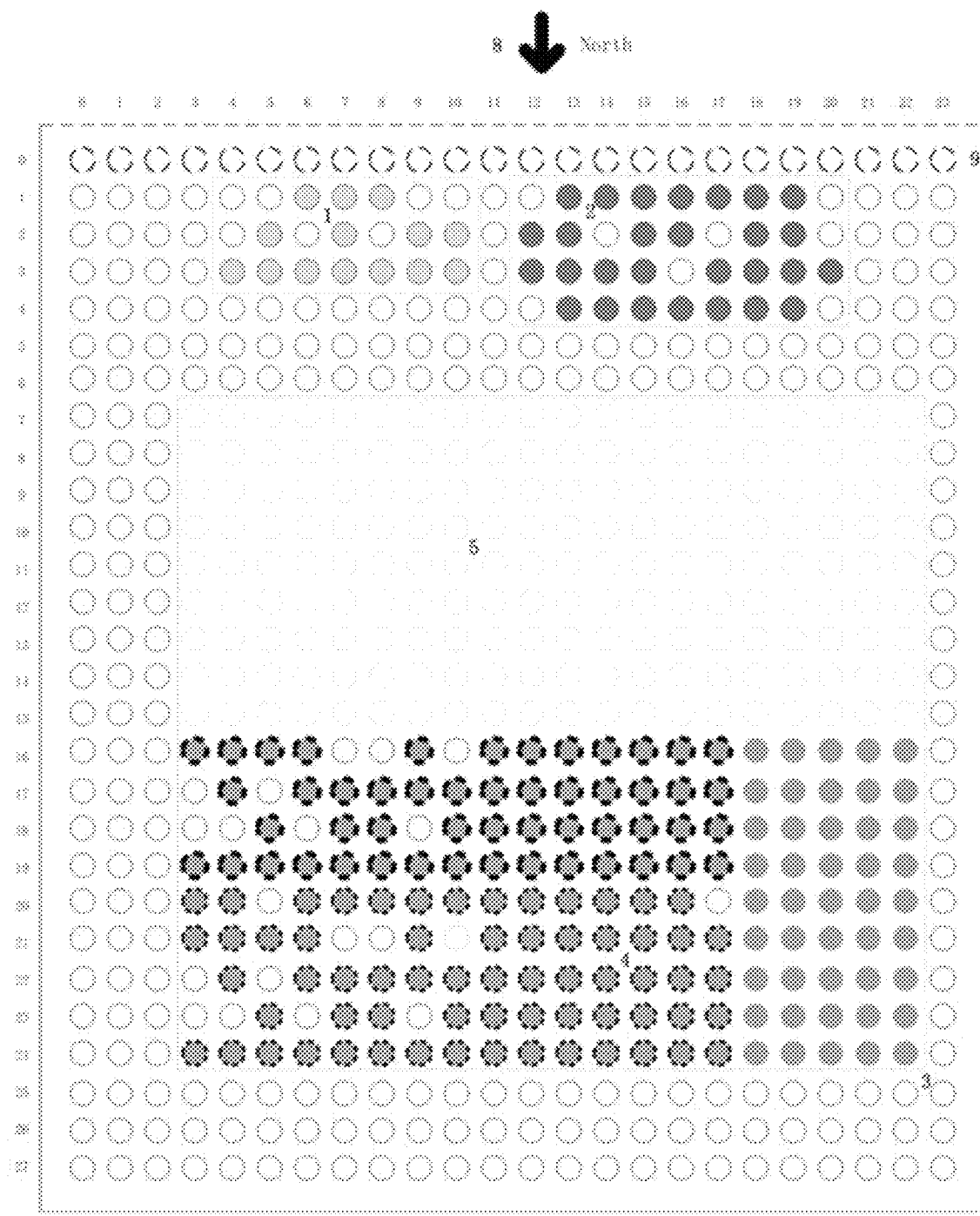
FIG. 2 is a schematic view of data resource in one or more embodiments of the present disclosure.

Referring to Table 1, the operating system of the brain-inspired computer may maintain a two-dimensional array with a core coordinate as a subscript, and the two-dimensional array can record core occupancy and IDs of occupied tasks. In a field of the core occupancy, a core that is not configured is corresponding to 0, a core that has been configured is corresponding to 1, and a core that needs to be configured for a spiking neural task is corresponding to 2. After the task that needs to be configured is successfully assigned, the core occupancy is updated to 1, and corresponding data resource is shown in FIG. 2, in which a task 1 (1) and a task 2 (2) have been assigned.

TABLE 1

| Brain-inspired resource usage table A | | |
|---|---|---|
| Core coordinate | Core occupancy config | Task ID |
| (0, 0) | 0 | −1 |
| ... | | |
| (5, 2) | 1 | 1 |
| (5, 3) | 1 | 1 |
| (15, 1) | 1 | 2 |
| (15, 2) | 1 | 2 |
| ... | | |
| (17, 7) | 2 | −1 |
| (23, 27) | | |

The operating system of the brain-inspired computer may maintain a global variable denoted as R (x_min, y_min, x_max, y_max), that is, a rectangular region defined by computing resources. (x_min, y_min) represents a coordinate of an upper-left corner of the rectangular region, and (x_max, y_max) represents a coordinate of lower-right corner of the rectangular region, such as R (0, 0, 23, 27) shown in FIG. 2.

The operating system of the brain-inspired computer may maintain an edge routing area denoted as R1 (x1_min, y1_min, x1_max, y1_min), such as R (0, 0, 23, 0) shown in FIG. 2.

When the operating system of the brain-inspired computer receives a new computing task 3 (3) and a coordinate of a target core of the computing task, in order to search for intra-chip routing based on a shortest step length principle, a specific method is as follows.

Figure 3:
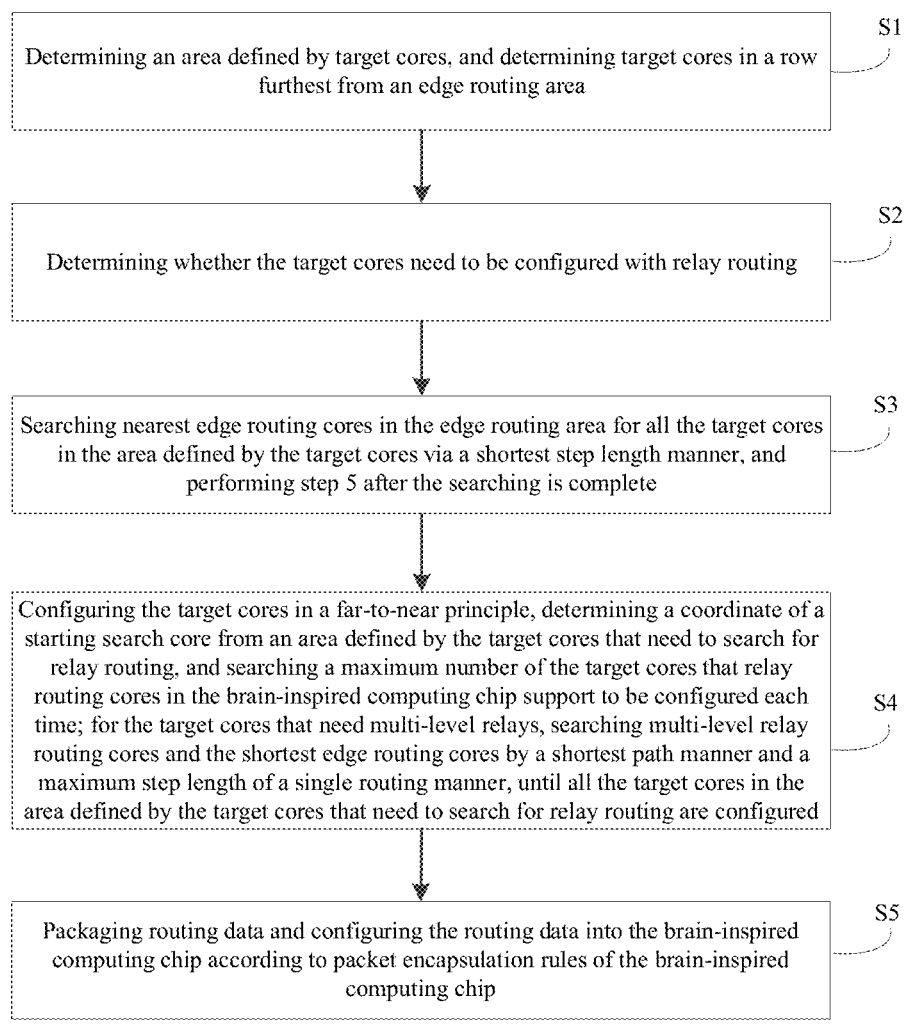
FIG. 3 is a flowchart view of a method of intra-chip routing of neural tasks for an operating system of a brain-inspired computer in one or more embodiments of the present disclosure.

Referring to FIG. 3, the present disclosure provides a method of intra-chip routing of neural tasks for an operating system of a brain-inspired computer. Cores in a brain-inspired computing chip are constructed into a two-dimensional grid, each grid represents a core, each core is configured to store model data of neural tasks and to provide relay routing, and the method includes the following step 1 to step 5.

The step 1 includes determining an area denoted as R2 (x2_min, y2_min, x2_max, y2_max), which is defined by target cores, and determining target cores denoted as R3 (x2_min, y2_max. x2_max, y2_max), which is in a row furthest from an edge routing area.

Referring to FIG. 2, the step 1 may include traversing the two-dimensional array that records the core occupancy, that is, a brain-inspired resource usage table A, and determining the area R2 (3, 7, 22, 24) defined by target cores, and determining target cores in a row R3 (3, 24, 22, 24) furthest from the edge routing area.

The step 2 includes determining whether the area R2 defined by target cores needs to be configured with relay routing, which may include the following scenarios.

Scenario (1), the area R2 defined by the target cores needs no relay routing. A step length from the cores R3 in the row furthest from the edge routing area to the edge routing area R1 is less than or equal to a maximum step length routed by the relay routing cores in the brain-inspired computing chip and denoted as MAX_STEP, all routes are reachable by the nearest edge routing cores. The area R2 defined by the target cores are determined to be a core area denoted as R5 that does not need to search for relay routing, and R2 and R5 satisfy the following formula: R5 (x5_min, y5_min, x5_max, y5_max)=R2. Step 3 is performed to search the nearest edge routing cores corresponding to all the target cores.

Scenario (2), the area R2 defined by the target cores needs relay routing. An area R4 (x4_min, y4_min, x4_max, y4_max) defined by the target cores that need to search for relay routing is determined, and step 4 is performed to search corresponding relay routing cores.

Scenario (3), some of the target cores need to be configured with relay routing, and the rest of the target cores do not need to be configured with relay routing. The area R4 (x4_min, y4_min, x4_max, y4_max) defined by the target cores that need to search for relay routing is determined, and the core area R5 (x5_min, y5_min, x5_max, y5_max) that does not need to search for relay routing is determined. The step 4 is performed to search corresponding relay routing cores and nearest edge routing cores for the area R4 defined by the target cores that need to search for relay routing, until the area R4 defined by the target cores that need to search for relay routing is configured. The step 3 is performed to configure the core area R5 that does not need to search for relay routing.

Finally, all target cores in the computing task can be configured, referring to FIGS. 2, R4 (3, 16, 22, 24), and R5 (3, 7, 22, 15) can be determined.

This method aims to configuring the target cores from a target core farthest from an input edge. When a farther target core needs relay routing, a nearer core can be the relay routing core, the relay routing core can be cleared after the configuration to configure a nearer target core. In this way, the method has an advantage that the target cores far away from the input edge can be configured without splitting a model connection.

The step 3 includes searching nearest edge routing cores in the edge routing area R1 for all the target cores in the area R2 defined by the target cores via a shortest step length manner, and recording the traversed target cores and searched edge routing cores to an intra-chip routing dictionary denoted as E. The step 5 is performed after the searching is completed.

TABLE 2

| Intra-chip routing dictionary E | | |
|---|---|---|
| Target cores (x, y) | Edge routing cores (x_edge, y_edge) | Relay routing cores (x_relay, y_relay) |
| (3, 24) | (11, 0) | (11, 6) |
| (4, 24) | (11, 0) | (11, 6) |
| (5, 24) | (11, 0) | (11, 6) |
| (6, 24) | (11, 0) | (11, 6) |
| (7, 24) | (11, 0) | (11, 6) |
| ... | ... | ... |

TABLE 2-continued

| Intra-chip routing dictionary E | | |
|---|---|---|
| Target cores (x, y) | Edge routing cores (x_edge, y_edge) | Relay routing cores (x_relay, y_relay) |
| (15, 20) | (11, 0) | (11, 6) |
| (16, 20) | (11, 0) | (11, 6) |

The nearest edge routing cores refer to edge routing cores with a shortest Manhattan distance from the target cores.

Referring to FIG. 2, a coordinate of an edge routing core of a target core (3, 7) can be (3,0), and a coordinate of an edge routing core of a target core (21, 9) can be (21, 0).

The step 4 includes configuring the target cores in a far-to-near principle in order to utilize a core unconfigured with a neural task as the relay routing, determining a coordinate of a starting search core from an area denoted as R4 (x4_min, y4_min, x4_max, y4_max) defined by the target cores that need to search for relay routing, the coordinate of the starting search core being denoted as search_core (x_search, y_search) and satisfying the following formula: search_core (x_search, y_search)=search_core (x4_min, y4_max); in order to configure the least relay routing cores and enable the number of target cores routed by a first-level relay routing core to be maximum, searching a maximum number 64 of the target cores that the relay routing cores in the brain-inspired computing chip support to be configured each time; for the target cores that need multi-level relays, searching multi-level relay routing cores and the nearest edge routing cores by a shortest path manner and a maximum step length of a single routing manner, until all the target cores in the area R4 defined by the target cores that need to search for relay routing are configured.

The step of searching for relay routing can include the following step 4.1 to step 4.4.

The step 4.1 can include traversing from the coordinate search_core of the starting search core, traversing horizontally with the maximum step length MAX_STEP routed by the relay routing cores in the brain-inspired computing chip, and not exceeding the area R4 defined by the target cores that need to search for relay routing, traversing vertically with the maximum step length MAX_STEP routed by the relay routing cores in the brain-inspired computing chip, and not exceeding the area R4 defined by the target cores that need to search for relay routing, i.e., a core edge of a computing task. The step 4.1 can further include recording the number of searched target cores, and ending the search when the number of searched target cores reaches the maximum number (i.e., 64) of the target cores that relay routing cores in the brain-inspired computing chip support to be configured. The step 4.1 can further include recording the searched target cores into a one-dimensional array list denoted as config_cores and updating a two-dimensional array that records core occupancy, i.e., a field of the core occupancy denoted as config in Table 1 named "brain-inspired resource usage table A" being 1, recording free cores which are traversed into a free core list denoted as "free_cores" as a configuration range of a first-level relay routing core; recording column coordinates of horizontal traversal which are denoted as x and row coordinates of vertical traversal which are denoted as y. The step 4.1 can further include for each row traversed, subtracting a row coordinate of the starting search core which is denoted as y_search by 1; and recording a maximum step length of the horizontal traversal which is denoted as X_STEPS.

The step 4.1 can further include when traversing vertically outside the area R4 defined by the target cores that need to search for relay routing, i.e., y_search is less than y4_min, ending the traversal, and updating the row coordinate and a column coordinate of the starting search core: y_search=y4_max, and x_search=x_search+X_STEPS.

The step 4.1 can further include when the number of traversed target cores is equal to the maximum number (64) of the target cores that relay routing cores in the brain-inspired computing chip support to be configured, and the current row is not traversed to the end, not updating the row coordinate y_search of the starting search core, and adding remaining untraversed cores in the current row to the free core list "free_cores" as the relay routing cores to select.

The step 4.1 can further include when the free core list "free_cores" is empty, adding cores in a row to which a row coordinate y_search of updated starting search core belongs to the free core list "free_cores" as the relay routing cores to select. In this way, the first-level relay routing core can be ensured to be found.

Traversing according to the above step has an advantage that the number of the target cores configured each time can reaches the maximum value 64 as much as possible, thus saving the number of the configured relay routing cores, and the step length of each traversal can be reachable.

Referring to FIG. 2, the step 4.1 can include traversing from search_core (3, 24), a coordinate (16, 20) is the 64th target core traversed, and updating x_search=3, y_search=20 after the traversal. The traversed free cores can be denoted as free_cores={(3, 23) (4, 23) (6, 23) (9, 23) (3, 22) (5, 22) (7, 21) (8, 21) (10, 21) (5, 20) (17, 20)}.

The step 4.2 can include searching a corresponding core as a first-level relay routing core denoted as relay (x, y) based on a principle of minimum sum of Manhattan distances from the relay routing core to all target cores, and updating searched relay routing core relay (x, y) to a relay routing dictionary denoted as F in Table 3. Next-hop cores of the relay routing core relay (x, y) are all target cores of this search.

TABLE 3

Relay routing dictionary F

| Relay routing core | Relay ID | Next-hop cores {(x, y)} |
|---|---|---|
| (10, 21) | 1 | (3, 24)(4, 24)(5, 24)(6, 24)(7, 24)(8, 24)(9, 24)(10, 24)(11, 24)(12, 24)(13, 24)(14, 24)(15, 24)(16, 24)(17, 24)(5, 23)(7, 23)(8, 23)(10, 23)(11, 23)(12, 23)(13, 23)(14, 23)(15, 23)(16, 23)(17, 23)(4, 22)(6, 22)(7, 22)(8, 22)(9, 22)(10, 22)(11, 22)(12, 22)(13, 22)(14, 22)(15, 22)(16, 22)(17, 22)(3, 21)(4, 21)(5, 21)(6, 21)(9, 21)(11, 21)(12, 21)(13, 21)(14, 21)(15, 21)(16, 21)(17, 21)(3, 20)(4, 20)(6, 20)(7, 20)(8, 20)(9, 20)(10, 20)(11, 20)(12, 20)(13, 20)(14, 20)(15, 20)(16, 20) |
| (11, 6) | 2 | (10, 21) |

The step 4.2 can further include cyclically traversing the free core list "free_cores" (x, y) to search the relay routing core relay (x,y) with minimum sum of Manhattan distances to all target cores in the one-dimensional array list config_cores, and the sum of Manhattan distances to all target cores is as follows:

$$\sum_{i=0}^{n} |x - \text{dest\_x}_i| + |y - \text{dest\_y}_i|$$

n represents the number of target cores to be configured, which is denoted as config_cores, x and y represent x coordinate and y coordinate of a free core denoted as core (free_cores [i]) in the free core list, respectively, dest_xi and dest_yi represent x coordinate and y coordinate of a target core denoted as config_cores [i].

Searching the relay routing cores according to the above step has an advantage that a step length from the relay routing cores to each of the corresponding target core can be shortest.

Referring to FIG. 2, the step length from the relay routing core relay (10, 21) searched in the free core list to the corresponding target cores can be a minimum sum of step length 326.

The step 4.3 can include calculating a shortest step length from the relay routing core relay (x, y) to the edge routing area R1, when the shortest step length is less than or equal to the maximum step length MAX_STEP routed by the relay routing cores in the brain-inspired computing chip, determining a nearest edge routing core of the relay routing core relay (x, y), which is denoted as edge (x, y_min). The step 4.3 can further include when the shortest step length is greater than the maximum step length MAX_STEP routed by the relay routing cores in the brain-inspired computing chip, continuing to search the multi-level relay routing cores and the nearest edge routing cores.

Referring to FIG. 2, the shortest step length from the first-level relay routing core relay (10, 21) to the edge routing area R1 is 21, i.e., the step length from the core (10, 21) to core (10, 0), which is greater than the MAX_STEP, and it is necessary to continue to search a proper relay routing core.

The step 4.4 can include determining an area of multi-level relay, which is denoted as R6 (x6_min, y6_min, x6_max, y6_max), or R6 (x_min, y_min, x_max, y_search), taking the relay routing core relay (x, y) as the first-level relay routing core, searching the multi-level relay routing cores and the nearest edge routing cores in the area of multi-level relay R6 by the shortest path manner and the maximum step length of the single routing manner.

Figure 4:
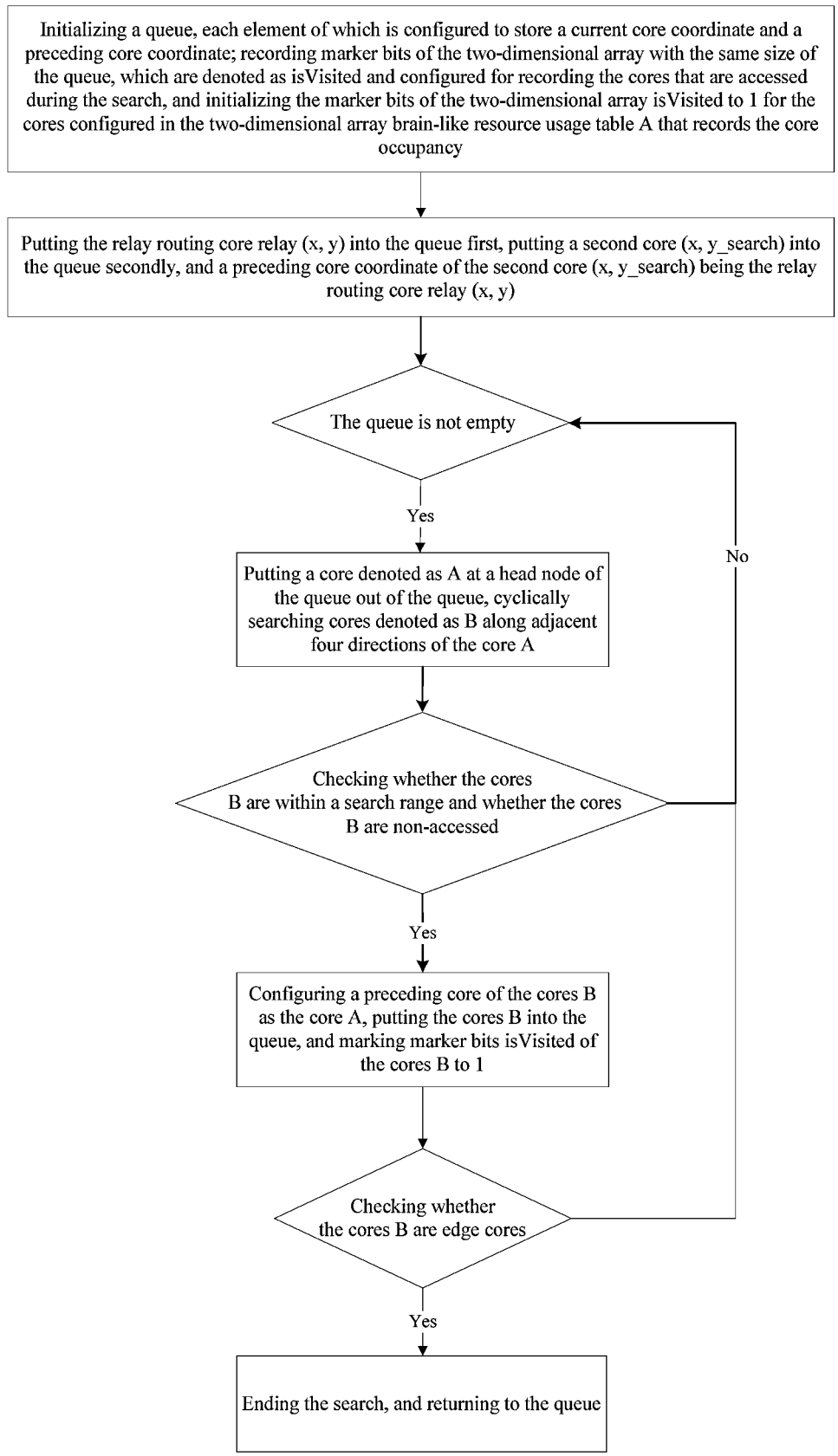
FIG. 4 is a flowchart view of searching a specifical path and nearest edge routing cores by a shortest path manner in one or more embodiments of the present disclosure.

Referring to FIG. 4, searching a specifical path and the nearest edge routing cores by the shortest path manner can include the following step 4.4.1 to step 4.4.6.

The step 4.4.1 can include initializing a queue, each element of which is configured to store a current core coordinate and a preceding core coordinate, and recording marker bits of the two-dimensional array with the same size of the queue, which are denoted as is Visited and configured for recording the cores that are accessed during the search. The step 4.4.1 can further include initializing the marker bits of the two-dimensional array is Visited to 1 for the cores configured in the two-dimensional array brain-inspired resource usage table A that records the core occupancy.

The step 4.4.2 can include putting the relay routing core relay (x, y) into the queue first, and putting a second core (x, y_search) with the column coordinate x of the relay routing core and the row coordinate y_search of the updated starting search core into the queue secondly. A preceding core coordinate of the second core (x, y_search) is the relay routing core relay (x, y).

The step 4.4.3 can include determining whether the queue is empty, if no, performing step 4.4.4, otherwise continuing the determining.

The step 4.4.4 can include when the queue is not empty, putting a core denoted as A at a head node of the queue out of the queue, cyclically searching cores denoted as B along adjacent four directions of the core A, and checking whether the cores B are within a search range and whether the cores B are non-accessed, if yes, performing step 4.4.5, otherwise returning to the step 4.4.3.

The step 4.4.5 can include configuring a preceding core of the cores B as the core A, putting the cores B into the queue, marking marker bits is Visited of the cores B to 1, and checking whether the cores B are edge routing cores, if yes, ending the search, and returning to the queue, otherwise returning to the step 4.4.3.

The step 4.4.6 can include taking the last element of the non-empty queue returned at the end of the search as the nearest edge routing cores of the shortest path which is denoted as edge_core. The step 4.4.6 can further include searching preceding cores recorded in the elements from the last element of the non-empty queue and recording the preceding cores in a path list denoted as "path_list", until searching to a first relay routing core relay (x, y). The path list "path_list" records all cores on the shortest path.

The maximum step length of the single routing manner can include searching multi-level relay routing cores from the path list "path_list" based on a principle of maximizing relay step length and route reachability, configuring the least relay routing cores upon a condition that the routes are reachable, so as to reduce overhead caused by the configuration of the relay routing cores, taking the relay routing core relay (x, y) as the first-level relay routing core, and searching a second-level relay routing core from the path list "path_list". A step length between the first-level relay routing core and the second-level relay routing core is the longest and does not exceed the maximum step length MAX_STEP routed by the relay routing cores in the brain-inspired computing chip. The maximum step length of the single routing manner can further include searching a third-level relay routing core based on the second-level relay routing core as a starting point, until a step length between the relay routing core and the edge routing core is no more than the maximum step length MAX_STEP routed by the relay routing cores in the brain-inspired computing chip, and recording searched relay routing cores to the relay routing dictionary F.

Referring to FIG. 2, the searched shortest path can be path_list={(10, 21) (10, 20) (10, 19) (11, 19) (11, 18) (11, 17) (11, 16) (11, 15) (11, 14) (11, 13) (11, 12) (11, 11) (11, 10) (11, 9) (11, 8) (11, 7) (11, 6) (11, 5) (11, 4) (11, 3) (11, 2) (11, 1) (11, 0)}. In the shortest path, the core (10, 21) can be the first-level the relay routing core, and the core (11, 0) can be the edge routing core. The farthest core, which is reachable by step length, from the first-level the relay routing core (10, 21) can be (11, 6) based on the principle of maximizing relay step length. Since a step length from the core (11, 5) to the core (10, 21) is 16, and a step length from the core (11, 6) to the core (10, 21) is 15, the core (11, 6) can be a second-level relay routing core. A step length from the second-level relay routing core (11, 6) to the edge routing core (11, 0) is 6 and less than the MAX_STEP, so that the multi-level relay routing cores can only include the first-level relay routing core and the second-level relay routing core.

The step 4.5 can include when the search is ended, performing the step 5 and configuring the relay routing dictionary and the target cores; and when the configuring is ended, returning to the step 4.1 to continue to search and configure other target cores that need relay routing according to the coordinate of updated starting search core denoted as search_core (x_search, y_search), until all the target cores that need relay routing are configured.

The step 5 includes packaging routing data and configuring the routing data into the brain-inspired computing chip based on the packet encapsulation rules of the brain-inspired computing chip.

The step 5 can further include packaging the relay routing dictionary F and the intra-chip routing dictionary E into a data packet recognizable by the brain-inspired computing chip according to packet encapsulation rules of the brain-inspired computing chip, and configuring the data packet into the brain-inspired computing chip.

Corresponding to the embodiment of the method of intra-chip routing of neural tasks for the operating system of the brain-inspired computer mentioned above, the present disclosure further provides some embodiments of a device 100 of intra-chip routing of neural tasks for an operating system of a brain-inspired computer.

Figure 5:
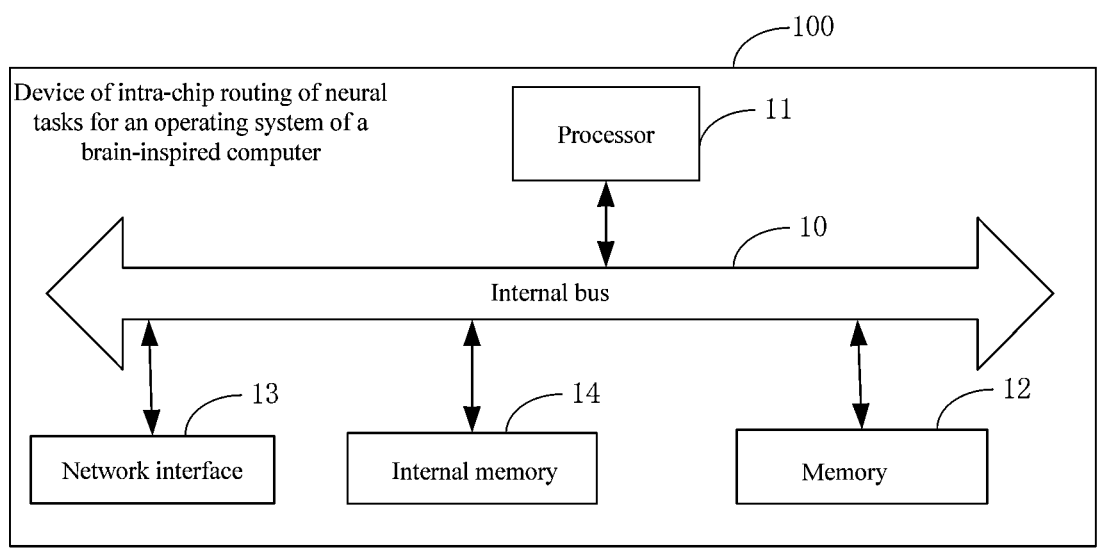
FIG. 5 is a flowchart view of a device of intra-chip routing of neural tasks for an operating system of a brain-inspired computer in one or more embodiments of the present disclosure.

Referring to FIG. 5, the present disclosure provides a device 100 of intra-chip routing of neural tasks for an operating system of a brain-inspired computer, including one or more processors 11 and a memory 12 that stores executable codes, the executable codes are executed by the processor 11 to implement the steps of the above method of intra-chip routing of neural tasks for the operating system of the brain-inspired computer.

Advantages of the present disclosure is as follows. A selection strategy for the relay routing cores and the edge routing cores can be provided in the present disclosure, a technical problem in the related art that routes are unreachable for the cores far away from the input edge can be solved. Moreover, the step length in the intra-chip routing is short, thus preventing the step length in the intra-chip routing from being too long to be reachable, and avoiding splitting the model connection to prolong running time of the neural task, thereby reducing the running time of the neural task.

The device 100 of intra-chip routing of neural tasks for the operating system of the brain-inspired computer in the present disclosure may be applied to any device with data processing capabilities, and the device may be a device or an apparatus such as a computer. The device in an embodiment may be implemented by software, or by hardware or a combination of software and hardware. Taking software implementation as an example, the device 100 of intra-chip routing of neural tasks for the operating system of the brain-inspired computer, as a device in a logical sense, is formed by reading corresponding computer program instructions in a nonvolatile memory to an internal memory 14 by a processor 11 of any device with data processing capabilities. For hardware implementation, referring to FIG. 5, FIG. 5 is a structural schematic diagram of a device 100 of intra-chip routing of neural tasks for the operating system of the brain-inspired computer in any device with data processing capabilities. The any device with data processing capabilities can include the open domain dialog reply device based on thematic enhancement in this embodiment. In addition to the processor 11, the internal memory 14, a network interface 13, an internal bus 10 and the memory shown in FIG. 5, the any device with data processing capabilities may also include other hardware based on the actual function of the device with data processing capabilities, which will not be described herein.

Alternatively, the memory 12 may include a mass memory for data or instructions. By way of example, rather than limitation, the memory 12 may include hard disk drives (HDDs), floppy disk drives, solid state drives (SSDs), flash drives, optical disks, magnetic discs, magnetic tapes, or Universal Serial Bus (USB) drives, or a combination of two or more of these. Where appropriate, the memory 12 may include removable or non-removable (or fixed) media. Where appropriate, the memory 12 may be inside or outside the data processing device. In a particular embodiment, the memory 12 is a Non-Volatile memory. In a particular embodiment, the memory 12 includes a read-only memory (ROM) and random-access memory (RAM).

An implementation process of the functions and roles of each unit in the above device is specifically detailed in an implementation process of the corresponding steps in the above method, which will not be described herein.

For the device in some embodiments, since it basically corresponds to the method in the above embodiment, reference can be made to the description of the method. The device described above are merely illustrative, and the unit described as a separate component may or may not be physically separated. The component displayed as a unit may or may not be a physical unit, that is, the component may be located in one place, or may also be distributed on a plurality of network units. Some or all of the units can be selected according to actual needs to achieve the solutions of the present disclosure. Those of ordinary skill in the art can understand and implement the present disclosure without creative work.

The present disclosure further provides a computer-readable storage medium. The computer-readable storage medium can store computer program instructions, and the computer program instructions can be executed by the processor 11 to implement any of the method of intra-chip routing of neural tasks for an operating system of a brain-inspired computer in the above embodiments.

The computer-readable storage medium may be an internal storage unit of the device with data processing capabilities described in any of the above embodiments, such as a hard disk or memory. The computer-readable storage medium may also be an external storage device, such as a pluggable hard disk, Smart Media Card (SMC), SD card, Flash Card and the like in the device. Furthermore, the computer-readable storage medium may further include both the internal storage unit of any device with data processing capabilities and the external storage device. The computer-readable storage medium is configured to store the computer program and other programs and data required by any device with data processing capabilities, and may also be configured to temporarily store data that has been output or will be output.

The above embodiments are only used to illustrate the technical solution of the present disclosure, and not to limit it. Although the embodiments of the present application are described in detail with reference to the above embodiments, it is understood by those of ordinary skill in the art that the embodiments described in the above embodiments may still be modified, or equivalent substitutions may be made to some or all of the technical features thereof, and these modifications or substitutions do not make the nature of the corresponding technical solutions depart from the scope of the technical solutions of the embodiments of this disclosure.

What is claimed is:

1. A method of intra-chip routing of neural tasks for an operating system of a brain-inspired computer, wherein cores in a brain-inspired computing chip are constructed into a two-dimensional grid, each grid represents a core, each core is configured to store model data of neural tasks and to provide relay routing, and the method comprises the following steps:

at step 1, determining an area defined by target cores, and determining target cores in a row furthest from an edge routing area;

at step 2, determining whether the target cores need to be configured with relay routing;

at step 3, searching nearest edge routing cores in the edge routing area for all the target cores in the area defined by the target cores via a shortest step length manner, and performing step 5 after the searching is completed;

at step 4, configuring the target cores in a far-to-near principle, determining a coordinate of a starting search core from an area defined by the target cores that need to search for relay routing, and searching a maximum number of the target cores that relay routing cores in the brain-inspired computing chip support to be configured each time; for the target cores that need multi-level relays, searching multi-level relay routing cores and the nearest edge routing cores by a shortest path manner and a maximum step length of a single routing manner, until all the target cores in the area defined by the target cores that need to search for relay routing are configured; and at step 5, packaging routing data and configuring the routing data into the brain-inspired computing chip according to packet encapsulation rules of the brain-inspired computing chip.

2. The method of claim 1, comprising the following scenarios:

scenario (1), the area defined by the target cores needs no relay routing, wherein a step length from the cores in the row furthest from the edge routing area to the edge routing area is less than or equal to a maximum step length routed by the relay routing cores in the brain-inspired computing chip, all routes are reachable by the nearest edge routing cores, the area defined by the target cores are determined to be a core area that does not need to search for relay routing, and the step 3 is performed to search the nearest edge routing cores corresponding to all the target cores;

scenario (2), the area defined by the target cores needs relay routing, wherein the area defined by the target cores that need to search for relay routing is determined, and the step 4 is performed to search corresponding relay routing cores; and scenario (3), some of the target cores need to be configured with relay routing, and the rest of the target cores do not need to be configured with relay routing, wherein the area defined by the target cores that need to search for relay routing is determined, and the core area that does not need to search for relay routing is determined; the step 4 is performed to search corresponding relay routing cores and nearest edge routing cores for the area defined by the target cores that need to search for relay routing, until the area defined by the target cores that need to search for relay routing is configured; and the step 3 is performed to configure the core area that does not need to search for relay routing.

3. The method of claim 1, wherein at the step 3, the nearest edge routing cores refer to edge routing cores with a shortest Manhattan distance from the target cores.

4. The method of claim 1, wherein the step 4 further comprises:

at step 4.1, traversing from the coordinate of the starting search core, traversing horizontally with a maximum step length routed by the relay routing cores in the brain-inspired computing chip, and not exceeding the area defined by the target cores that need to search for relay routing; traversing vertically with the maximum step length routed by the relay routing cores in the brain-inspired computing chip, and not exceeding the area defined by the target cores that need to search for relay routing; recording the number of searched target cores, and ending the search when the number of searched target cores reaches the maximum number of the target cores that relay routing cores in the brain-inspired computing chip support to be configured; recording the searched target cores into a one-dimensional array list and updating a two-dimensional array that records core occupancy; recording free cores which are traversed into a free core list as a configuration range of a first-level relay routing core; recording column coordinates of horizontal traversal and row coordinates of vertical traversal; for each row traversed, subtracting a row coordinate of the starting search core by 1; and recording a maximum step length of the horizontal traversal;

when traversing vertically outside the area defined by the target cores that need to search for relay routing, ending the traversal; and updating the row coordinate and a column coordinate of the starting search core;

when the number of traversed target cores is equal to the maximum number of the target cores that relay routing cores in the brain-inspired computing chip support to be configured, and the current row is not traversed to the end, not updating the row coordinate of the starting search core, and adding remaining untraversed cores in the current row to the free core list as the relay routing cores to select; and when the free core list is empty, adding cores in a row to which a row coordinate of updated starting search core belongs to the free core list as the relay routing cores to select;

at step 4.2, searching a corresponding core as a first-level relay routing core based on a principle of minimum sum of Manhattan distances from the relay routing core to all target cores, and updating searched relay routing core to a relay routing dictionary, wherein next-hop cores of the relay routing core are all target cores of this search;

at step 4.3, calculating a shortest step length from the relay routing core to the edge routing area, when the shortest step length is less than or equal to the maximum step length routed by the relay routing cores in the brain-inspired computing chip, determining a nearest edge routing core of the relay routing core; when the shortest step length is greater than the maximum step length routed by the relay routing cores in the brain-inspired computing chip, continuing to search the multi-level relay routing cores and the nearest edge routing cores;

at step 4.4, determining an area of multi-level relay, taking the relay routing core as the first-level relay routing core, searching the multi-level relay routing cores and the nearest edge routing cores in the area of multi-level relay by the shortest path manner and the maximum step length of the single routing manner, and updating searched relay routing cores to the relay routing dictionary; and at step 4.5, when the search is ended, performing the step 5 and configuring the relay routing dictionary and the target cores; and when the configuring is ended, returning to the step 4.1 to continue to search and configure other target cores that need relay routing according to the coordinate of updated starting search core, until all the target cores that need relay routing are configured.

5. The method of claim 4, wherein at the step 4.1, outside the area defined by the target core that need to search for relay routing, refers to that the row coordinate of the starting search core is less than a minimum row coordinate of the area defined by the target cores that need to search for relay routing; and updating the row coordinate and the column coordinate of the starting search core, refers to taking a maximum row coordinate of the area defined by the target cores that need to search for relay routing as a new row coordinate of the starting search core, and taking a sum of the column coordinate of the starting search core and the maximum step length of the horizontal traversal as a new column coordinate of the starting search core.

6. The method of claim 4, wherein the step 4.2 further comprises cyclically traversing the free core list to search the relay routing core with minimum sum of Manhattan distances to all target cores in the one-dimensional array list, wherein the sum of Manhattan distances to all target cores is as follows:

$$\sum_{i=0}^{n} |x - \text{dest\_x}_i| + |y - \text{dest\_y}_i|$$

n represents the number of target cores to be configured in the one-dimensional array list, x and y represent coordinates of a free core in the free core list, dest_xi and dest_yi represent coordinates of a target core to be configured in the one-dimensional array list.

7. The method of claim 4, wherein at the step 4.4, searching a specifical path and the nearest edge routing cores by the shortest path manner comprises:

at step 4.4.1, initializing a queue, each element of which is configured to store a current core coordinate and a preceding core coordinate; recording marker bits of the two-dimensional array with the same size of the queue, configured for recording the cores that are accessed during the search, and initializing the marker bits of the two-dimensional array to 1 for the cores configured in the two-dimensional array that records the core occupancy;

at step 4.4.2, putting the relay routing core into the queue first, and putting a second core with the column coordinate of the relay routing core and the row coordinate of the updated starting search core into the queue secondly;

at step 4.4.3, determining whether the queue is empty, if no, performing step 4.4.4, otherwise continuing the determining;

at step 4.4.4, when the queue is not empty, putting a core denoted as A at a head node of the queue out of the queue, cyclically searching cores denoted as B along adjacent four directions of the core A, checking whether the cores B are within a search range and whether the cores B are non-accessed, if yes, performing step 4.4.5, otherwise returning to the step 4.4.3;

at step 4.4.5, configuring a preceding core of the cores B as the core A, putting the cores B into the queue, marking marker bits of the cores B to 1, checking whether the cores B are edge routing cores, if yes, ending the search, and returning to the queue, otherwise returning to the step 4.4.3; and at step 4.4.6, taking the last element of the non-empty queue returned at the end of the search as the nearest edge routing cores of the shortest path, and searching preceding cores recorded in the elements from the last element of the non-empty queue and recording the preceding cores in a path list, until searching to a first relay routing core, wherein the path list records all cores on the shortest path.

8. The method of claim 4, wherein at the step 4.4, the maximum step length of the single routing manner comprises:

searching multi-level relay routing cores from a path list based on a principle of maximizing relay step length and route reachability; taking the relay routing core as the first-level relay routing core, and searching a second-level relay routing core from the path list, wherein a step length between the first-level relay routing core and the second-level relay routing core is the longest and does not exceed the maximum step length routed by the relay routing cores in the brain-inspired computing chip; and searching a third-level relay routing core based on the second-level relay routing core as a starting point, until a step length between the relay routing core and the edge routing cores is no more than the maximum step length routed by the relay routing cores in the brain-inspired computing chip, and recording searched relay routing cores to the relay routing dictionary.

9. The method of claim 4, wherein the step 3 further comprises recording the traversed target cores and searched edge routing cores to an intra-chip routing dictionary, the step 5 further comprises packaging the relay routing dictionary and the intra-chip routing dictionary into a data packet recognizable by the brain-inspired computing chip based on the packet encapsulation rules of the brain-inspired computing chip, and configuring the data packet into the brain-inspired computing chip.

10. A device of intra-chip routing of neural tasks for an operating system of a brain-inspired computer, comprising one or more processors and a memory that stores executable codes, wherein the executable codes are executed by the processor to implement the steps of the method of intra-chip routing of neural tasks for the operating system of the brain-inspired computer of claim 1.

11. The device of intra-chip routing of neural tasks for the operating system of the brain-inspired computer of claim 10, wherein the method comprises the following scenarios:

scenario (1), the area defined by the target cores needs no relay routing, wherein a step length from the cores in the row furthest from the edge routing area to the edge routing area is less than or equal to a maximum step length routed by the relay routing cores in the brain-inspired computing chip, all routes are reachable by the nearest edge routing cores, the area defined by the target cores are determined to be a core area that does not need to search for relay routing, and the step 3 is performed to search the nearest edge routing cores corresponding to all the target cores;

scenario (2), the area defined by the target cores needs relay routing, wherein the area defined by the target cores that need to search for relay routing is determined, and the step 4 is performed to search corresponding relay routing cores; and scenario (3), some of the target cores need to be configured with relay routing, and the rest of the target cores do not need to be configured with relay routing, wherein the area defined by the target cores that need to search for relay routing is determined, and the core area that does not need to search for relay routing is determined; the step 4 is performed to search corresponding relay routing cores and nearest edge routing cores for the area defined by the target cores that need to search for relay routing, until the area defined by the target cores that need to search for relay routing is configured; and the step 3 is performed to configure the core area that does not need to search for relay routing.

12. The device of intra-chip routing of neural tasks for the operating system of the brain-inspired computer of claim 10, wherein at the step 3, the nearest edge routing cores refer to edge routing cores with a shortest Manhattan distance from the target cores.

13. The device of intra-chip routing of neural tasks for the operating system of the brain-inspired computer of claim 10, wherein the step 4 further comprises:

at step 4.1, traversing from the coordinate of the starting search core, traversing horizontally with a maximum step length routed by the relay routing cores in the brain-inspired computing chip, and not exceeding the area defined by the target cores that need to search for relay routing; traversing vertically with the maximum step length routed by the relay routing cores in the brain-inspired computing chip, and not exceeding the area defined by the target cores that need to search for relay routing; recording the number of searched target cores, and ending the search when the number of searched target cores reaches the maximum number of the target cores that relay routing cores in the brain-inspired computing chip support to be configured; recording the searched target cores into a one-dimensional array list and updating a two-dimensional array that records core occupancy; recording free cores which are traversed into a free core list as a configuration range of a first-level relay routing core; recording column coordinates of horizontal traversal and row coordinates of vertical traversal; for each row traversed, subtracting a row coordinate of the starting search core by 1; and recording a maximum step length of the horizontal traversal;

when traversing vertically outside the area defined by the target cores that need to search for relay routing, ending the traversal; and updating the row coordinate and a column coordinate of the starting search core;

when the number of traversed target cores is equal to the maximum number of the target cores that relay routing cores in the brain-inspired computing chip support to be configured, and the current row is not traversed to the end, not updating the row coordinate of the starting search core, and adding remaining untraversed cores in the current row to the free core list as the relay routing cores to select; and when the free core list is empty, adding cores in a row to which a row coordinate of updated starting search core belongs to the free core list as the relay routing cores to select;

at step 4.2, searching a corresponding core as a first-level relay routing core based on a principle of minimum sum of Manhattan distances from the relay routing core to all target cores, and updating searched relay routing core to a relay routing dictionary, wherein next-hop cores of the relay routing core are all target cores of this search;

at step 4.3, calculating a shortest step length from the relay routing core to the edge routing area, when the shortest step length is less than or equal to the maximum step length routed by the relay routing cores in the brain-inspired computing chip, determining a nearest edge routing core of the relay routing core; when the shortest step length is greater than the maximum step length routed by the relay routing cores in the brain-inspired computing chip, continuing to search the multi-level relay routing cores and the nearest edge routing cores;

at step 4.4, determining an area of multi-level relay, taking the relay routing core as the first-level relay routing core, searching the multi-level relay routing cores and the nearest edge routing cores in the area of multi-level relay by the shortest path manner and the maximum step length of the single routing manner, and updating searched relay routing cores to the relay routing dictionary; and at step 4.5, when the search is ended, performing the step 5 and configuring the relay routing dictionary and the target cores; and when the configuring is ended, returning to the step 4.1 to continue to search and configure other target cores that need relay routing according to the coordinate of updated starting search core, until all the target cores that need relay routing are configured.

14. The device of intra-chip routing of neural tasks for the operating system of the brain-inspired computer of claim 13, wherein at the step 4.1, outside the area defined by the target core that need to search for relay routing, refers to that the row coordinate of the starting search core is less than a minimum row coordinate of the area defined by the target cores that need to search for relay routing; and updating the row coordinate and the column coordinate of the starting search core, refers to taking a maximum row coordinate of the area defined by the target cores that need to search for relay routing as a new row coordinate of the starting search core, and taking a sum of the column coordinate of the starting search core and the maximum step length of the horizontal traversal as a new column coordinate of the starting search core.

15. The device of intra-chip routing of neural tasks for the operating system of the brain-inspired computer of claim 13, wherein the step 4.2 further comprises cyclically traversing the free core list to search the relay routing core with minimum sum of Manhattan distances to all target cores in the one-dimensional array list, wherein the sum of Manhattan distances to all target cores is as follows:

$$\sum_{i=0}^{n} |x - \text{dest\_x}_i| + |y - \text{dest\_y}_i|$$

n represents the number of target cores to be configured in the one-dimensional array list, x and y represent coordinates of a free core in the free core list, dest_xi and dest_yi represent coordinates of a target core to be configured in the one-dimensional array list.

16. The device of intra-chip routing of neural tasks for the operating system of the brain-inspired computer of claim 13, wherein at the step 4.4, searching a specific path and the nearest edge routing cores by the shortest path manner comprises:

at step 4.4.1, initializing a queue, each element of which is configured to store a current core coordinate and a preceding core coordinate; recording marker bits of the two-dimensional array with the same size of the queue, configured for recording the cores that are accessed during the search, and initializing the marker bits of the two-dimensional array to 1 for the cores configured in the two-dimensional array that records the core occupancy;

at step 4.4.2, putting the relay routing core into the queue first, and putting a second core with the column coordinate of the relay routing core and the row coordinate of the updated starting search core into the queue secondly;

at step 4.4.3, determining whether the queue is empty, if no, performing step 4.4.4, otherwise continuing the determining;

at step 4.4.4, when the queue is not empty, putting a core denoted as A at a head node of the queue out of the queue, cyclically searching cores denoted as B along adjacent four directions of the core A, checking whether the cores B are within a search range and whether the cores B are non-accessed, if yes, performing step 4.4.5, otherwise returning to the step 4.4.3;

at step 4.4.5, configuring a preceding core of the cores B as the core A, putting the cores B into the queue, marking marker bits of the cores B to 1, checking whether the cores B are edge routing cores, if yes, ending the search, and returning to the queue, otherwise returning to the step 4.4.3; and at step 4.4.6, taking the last element of the non-empty queue returned at the end of the search as the nearest edge routing cores of the shortest path, and searching preceding cores recorded in the elements from the last element of the non-empty queue and recording the preceding cores in a path list, until searching to a first relay routing core, wherein the path list records all cores on the shortest path.

17. The device of intra-chip routing of neural tasks for the operating system of the brain-inspired computer of claim 13, wherein at the step 4.4, the maximum step length of the single routing manner comprises:

searching multi-level relay routing cores from a path list based on a principle of maximizing relay step length and route reachability; taking the relay routing core as the first-level relay routing core, and searching a second-level relay routing core from the path list, wherein a step length between the first-level relay routing core and the second-level relay routing core is the longest and does not exceed the maximum step length routed by the relay routing cores in the brain-inspired computing chip; and searching a third-level relay routing core based on the second-level relay routing core as a starting point, until a step length between the relay routing core and the edge routing cores is no more than the maximum step length routed by the relay routing cores in the brain-inspired computing chip, and recording searched relay routing cores to the relay routing dictionary.

18. The device of intra-chip routing of neural tasks for the operating system of the brain-inspired computer of claim 13, wherein the step 3 further comprises recording the traversed target cores and searched edge routing cores to an intra-chip routing dictionary, the step 5 further comprises packaging the relay routing dictionary and the intra-chip routing dictionary into a data packet recognizable by the brain-inspired computing chip based on the packet encapsulation rules of the brain-inspired computing chip, and configuring the data packet into the brain-inspired computing chip.

* * * * *